(12) United States Patent
Ota et al.

(10) Patent No.: US 6,429,972 B1
(45) Date of Patent: Aug. 6, 2002

(54) DIFFRACTION LENS

(75) Inventors: Kohei Ota; Toshihiko Kiriki, both of Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/516,783

(22) Filed: Mar. 1, 2000

(30) Foreign Application Priority Data

Mar. 2, 1999 (JP) ............................................. 11-053919

(51) Int. Cl.$^7$ .............................. G02B 5/18; G02B 27/44
(52) U.S. Cl. ........................ 359/569; 359/565; 359/566; 359/571
(58) Field of Search ................................ 359/565, 566, 359/571, 569; 351/160 R, 161

(56) References Cited

U.S. PATENT DOCUMENTS 5,120,120 A * 6/1992 Cohen ......................... 359/571
5,344,447 A * 9/1994 Swanson ..................... 359/565
5,699,142 A * 12/1997 Lee et al. .................... 359/571

* cited by examiner

*Primary Examiner*—Audrey Chang
(74) *Attorney, Agent, or Firm*—Finnegan, Henderson, Farabow, Garrett & Dunner, L.L.P.

(57) ABSTRACT

A diffractive lens, comprises an optical axis; a lens surface having a peripheral portion, and a diffractive relief provided on the lens surface, wherein the diffractive relief is shaped in annular zones, and wherein following conditional formulas (1) and (2) are satisfied:

$$h_{i-1} \leq h < h_i \quad (1)$$

$$x = f(h - h_{ti}) + S \quad (2)$$

where i is a suffix showing an ordinal number of each of the diffractive annular zones obtained by counting each diffractive annular zone in such a manner that a diffractive annular zone including the optical axis is counted as a first diffractive annular zone and other diffractive annular zones are counted respectively in consecutive order from the optical axis toward the peripheral portion; h is a distance between a point and X axis in which, when the optical axis is deemed as X axis, the distance is from X axis to the point in a direction perpendicular to X axis; $h_i$ is a distance from X axis to a border between i-th diffractive annular zone and (i+1)-th diffractive annular zone which are counted from the optical axis in the above manner, provided that $h_0=0$; f(h) is a function of h; $h_{ti}$ is a constant in which at least one of $h_{ti}$ is not zero; an S is a term characterizing an aspherical surface.

4 Claims, 5 Drawing Sheets

DIFFRACTION LENS

BACKGROUND OF THE INVENTION

This invention relates to a diffraction lens and the method of designing the same, in particular, to a diffraction lens having a diffraction relief on a lens surface and the method of designing the diffraction lens.

For a diffraction lens, it has been heretofore known a lens which has a diffraction relief for generating diffraction on a lens surface. For example, in respect of a diffraction lens for use in an optical pick up device, an achromatic objective lens and a two-focus objective lens which utilize the characteristics peculiar to diffraction have been proposed.

The shape of the lens surface of these diffraction lenses is optimized by a method of adding an optical path difference function on the virtual basic aspherical surface or basic spherical surface by the high refractive index method or phase function method, and after that, it is transformed into the actual shape of a diffraction relief having steps from the optical path difference function.

The positions of the steps in the direction perpendicular to the optical axis can be obtained as the height such that the optical path difference function varies by an amount of an integral number times the wavelength, and the amount of variation in the direction of the optical axis is approximated by a function form in order to be easily treated. For example, in the publication of TOKKAIHEI 10-186231, it is disclosed that the amount of displacement in a diffraction relief and the amount of displacement in a basic aspherical surface with a diffraction relief added are approximated by a polynomial with a distance from the optical axis made as a variable.

However, the above-described method of approximation using a polynomial has a problem that the working of diffraction lenses is likely to become complicated because of the large number of the terms in the function [form].

SUMMARY OF THE INVENTION

This invention has been done in view of it that the respective surfaces of the diffraction annular zones can be approximated as surfaces formed by rotation around the respective predetermined points on the virtual basic aspherical surface or basic spherical surface, and an object of this invention is to provide the method of designing a diffraction lens wherein a high-precision approximate shape can be obtained by a simple expression in the process of transformation from the optical path difference function to the actual shape of a diffraction relief having steps. Further, another object of this invention is to provide a diffraction lens which has a diffraction relief with a simple shape and is made by a high-precision expression.

The above-described objects can be accomplished by any one of the following structures and methods:
1. A diffractive lens, comprises
    an optical axis;
    a lens surface having a peripheral portion, and
    a diffractive relief provided on the lens surface,
    wherein the diffractive relief is shaped in annular zones, and
    wherein following conditional formulas (1) and (2) are satisfied:

$$h_{i-1} \leq h < h_i \quad (1)$$

$$x = f(h - h_{ti}) + S \quad (2)$$

where
    i is a suffix showing an ordinal number of each of the diffractive annular zones obtained by counting each diffractive annular zone in such a manner that a diffractive annular zone including the optical axis is counted as a first diffractive annular zone and other diffractive annular zones are counted respectively in consecutive order from the optical axis toward the peripheral portion;
    h is a distance between a point and X axis in which, when the optical axis is deemed as X axis, the distance is from X axis to the point in a direction perpendicular to X axis;
    $h_i$ is a distance from X axis to a border between i-th diffractive annular zone and (i+1)-th diffractive annular zone which are counted from the optical axis in the above manner, provided that $h_0=0$;
    f(h) is a function of h;
    $h_{ti}$ is a constant in which at least one of $h_{ti}$ is not zero; and
    S is a term characterizing an aspherical surface.

It may be preferable that S is zero, because a highly precise diffractive lens may be produced more easily.

2. The diffractive lens described in paragraph 1, wherein f(h) is a following conditional formula (3):

$$f(h - h_{ti}) = \frac{(h - h_{ti})^2 / r_{ti}}{1 + \sqrt{1 - (h - h_{ti})^2 / r_{ti}^2}} + x_{ti} - r_{ti} \quad (3)$$

where $r_{ti}$ is a constant and $x_{ti}$ is a constant.

3. The diffractive lens described in paragraph 1, wherein the diffractive relief is shaped in a sawtooth.

4. The diffractive lens described in paragraph 3, wherein a difference in a direction parallel to the optical axis between a cross sectional shape of the diffractive relief and a shape represented by a following general formula (4) is not larger than 0.2 of a basic wavelength:

$$x(h) = \frac{\Phi_D(h)\cos\theta}{\cos\alpha\{n - n'\cos(\theta - \theta')\}} + x_B(h) \quad (4)$$

where
    $x_B(h)$ represents a shape of a basic aspherical surface or a basic spherical surface;
    $\Phi_D(h)$ represents an optical path difference produced by providing the diffractive relief on the lens surface;
    θ is an angle made between a ray, which comes from an object point on the optical axis and is incident on a diffractive surface, and a normal line on the diffractive surface.;
    θ' is an angle made betwee a ray, which comes from the object point on the optical axis and emerges from the diffraction surface, and a normal line on the diffractive surface;
    α is an angle made between the optical axis and a normal line on the diffractive surface;
    n is a refractive index of the incident side of the diffractive surface; and
    n' is a refractive index of the emerging side of the diffractive surface.

5. A method of manufacturing a mold to produce a diffractive lens having a diffractive relief on a lens surface, comprises steps of:
    inputting data regarding a shape of the diffractive relief into a computer provided to a mold processing machine; and processing a metal block by the mold processing machine controlled by the computer based on the inputted data so that the mold to produce the diffractive lens is manufactured, wherein the data are represented by following conditional formulas (1) and (2):

$$h_{i-1} \leq h < h_i \tag{1}$$

$$x = f(h - h_{ti}) \tag{2}$$

where i is a suffix showing an ordinal number of each of the diffractive annular zones obtained by counting each diffractive annular zone in such a manner that a diffractive annular zone including the optical axis is counted as a first diffractive annular zone and other diffractive annular zones are counted respectively in consecutive order from the optical axis toward the peripheral portion;

h is a distance between a point and X axis in which, when the optical axis is deemed as X axis, the distance is from X axis to the point in a direction perpendicular to X axis;

$h_i$ is a distance from X axis to a border between i-th diffractive annular zone and (i+1)-th diffractive annular zone which are counted from the optical axis in the above manner, provided that $h_0=0$;

f(h) is a function of h; and $h_{ti}$ is a constant in which at least one of $h_{ti}$ is not zero.

6. A method of producing a diffractive lens having a diffractive relief on a lens surface, comprises steps of:

inputting data regarding a shape of the diffractive relief into a computer provided to a mold processing machine;

processing a metal block by the mold processing machine controlled by the computer based on the inputted data so that the mold to produce the diffractive lens is manufactured, and producing the diffractive lens by injecting molding a melted plastic with use of the mold;

wherein the data are represented by following conditional formulas (1) and (2):

$$h_{i-1} \leq h < h_i \tag{1}$$

$$x = f(h - h_{ti}) \tag{2}$$

where i is a suffix showing an ordinal number of each of the diffractive annular zones obtained by counting each diffractive annular zone in such a manner that a diffractive annular zone including the optical axis is counted as a first diffractive annular zone and other diffractive annular zones are counted respectively in consecutive order from the optical axis toward the peripheral portion;

h is a distance between a point and X axis in which, when the optical axis is deemed as X axis, the distance is from X axis to the point in a direction perpendicular to X axis;

$h_i$ is a distance from X axis to a border between i-th diffractive annular zone and (i+1)-th diffractive annular zone which are counted from the optical axis in the above manner, provided that $h_0=0$;

f(h) is a function of h; and $h_{ti}$ is a constant in which at least one of $h_{ti}$ is not zero.

7. A method of designing a diffractive lens having a diffractive relief on a lens surface, wherein the diffractive relief is shaped in annular zones, comprises steps of:

designing the diffractive lens so as to satisfy following conditional formulas (1) and (2):

$$h_{i-1} \leq h < h_i \tag{1}$$

$$x = f(h - h_{ti}) \tag{2}$$

where i is a suffix showing an ordinal number of each of the diffractive annular zones obtained by counting each diffractive annular zone in such a manner that a diffractive annular zone including the optical axis is counted as a first diffractive annular zone and other diffractive annular zones are counted respectively in consecutive order from the optical axis toward the peripheral portion;

h is a distance between a point and X axis in which, when the optical axis is deemed as X axis, the distance is from X axis to the point in a direction perpendicular to X axis;

$h_i$ is a distance from X axis to a border between i-th diffractive annular zone and (i+1)-th diffractive annular zone which are counted from the optical axis in the above manner, provided that $h_0=0$;

f(h) is a function of h; and $h_{ti}$ is a constant in which at least one of $h_{ti}$ is not zero.

Further, the above-described objects may be accomplished by any one of the following preferable structures:

8. A diffraction lens having a diffraction relief on a lens surface, wherein the optical axis of said diffraction lens is let to be the x-axis, h is let to be the distance from said optical axis in the direction perpendicular to said optical axis, and assuming that h falls within the range expressed by the inequality (1) described below, the shape of a diffraction relief on at least one lens surface is expressed by the following equation (2):

$$h_{i-1} \leq h < h_i \tag{1}$$

$$x = f(h - h_{ti}) \tag{2}$$

where i, $h_i$, f(h), and $h_{ti}$ have meanings described below:

i: a suffix showing the ordinal number of the diffraction annular zones obtained by counting the diffraction annular zones in consecutive order from the diffraction annular zone of the diffraction relief including the optical axis, which is made the first annular zone, toward the circumference;

$h_i$: the distance of the border between the ith diffraction annular zone and the (i+1)th diffraction annular zone from the optical axis, where $h_0=0$;

f(h): a function of h; and $h_{ti}$: a constant with i made a suffix, where at least one of $h_{ti}$ is not zero.

9. A diffraction lens having a diffraction relief on a lens surface, wherein the optical axis of said diffraction lens is let to be the x-axis, h is let to be the distance from said optical axis in the direction perpendicular to said optical axis, and assuming that h falls within the range expressed by the inequality (1) described below, the shape of a diffraction relief on at least one lens surface is expressed by the following equation (2'):

$$h_{i-1} \leq h < h_i \tag{1}$$

$$x = f(h - h_{ti}) + S \tag{2'}$$

where i, $h_i$, f(h), $h_{ti}$, and S have meanings described below:

i: a suffix showing the ordinal number of the diffraction annular zones obtained by counting the diffraction annular zones in consecutive order from the diffraction annular zone of the diffraction relief including the optical axis, which is made the first annular zone, toward the circumference;

$h_i$: the distance of the border between the ith diffraction annular zone and the (i+1)th diffraction annular zone from the optical axis, where $h_0=0$;

f(h): a function of h;

$h_{ti}$: a constant as i made a suffix, where at least one of $h_{ti}$ is not zero; and S: a term characterizing an aspherical surface.

10. The diffraction lens set forth in the above-described paragraph 8 or 9, wherein the expression of the aforesaid function of h f(h) is the below-described expression (M3):

(M3)

$$f(h-h_{ti}) = \frac{(h-h_{ti})^2/r_{ti}}{1+\sqrt{1-(h-h_{ti})^2/r_{ti}^2}} + x_{ti} - r_{ti} \qquad (3)$$

where $r_{ti}$ and $x_{ti}$ have meanings described in the following:

$r_{ti}$: a constant having i as a suffix; and $x_{ti}$: a constant having i as a suffix.

11. The diffraction lens set forth the above-described paragraphs 8, 9, or 10, which is designed by a method of adding an optical path difference function onto the virtual basic aspherical surface or basic spherical surface and has a diffraction relief composed of diffraction annular zones having a sawtooth cross-sectional shape in the plane including the optical axis, wherein the deviation in the direction parallel to the optical axis between said cross-sectional shape of the diffraction relief and the shape expressed by the below-described expression M4 is equal to or smaller than one fifth of the standard wavelength:

(M4)

$$x(h) = \frac{\Phi_D(h)\cos\theta}{\cos\alpha\{n-n'\cos(\theta-\theta')\}} + x_B(h) \qquad (4)$$

where $x_B(h)$, $\Phi_D(h)$, θ, θ', α, n, and n' have meanings described in the following:

$x_B(h)$: the shape of the basic aspherical surface or basic spherical surface;

$\Phi_D(h)$: the optical path difference produced by providing a diffraction relief on the lens surface;

θ: the angle made by a ray which comes from an object point on the optical axis and is incident on the diffraction surface and the normal to said diffraction surface;

θ': the angle made by a ray which comes from an object point on the optical axis and emerges from the diffraction surface and the normal to said diffraction surface;

α: the angle made by the optical axis and the normal to the diffraction surface;

n: the refractive index of the incident side of the diffraction surface; and n': the refractive index of the emerging side of the diffraction surface.

12. A method of designing a diffraction lens having a diffraction relief on a lens surface, wherein the optical axis of said diffraction lens is let to be the x-axis, h is let to be the distance from said optical axis in the direction perpendicular to said optical axis, and assuming that h falls within the range expressed by the inequality (1) described below, the shape of a diffraction relief on at least one lens surface is expressed by the following equation (2):

$$h_{i-1} \leq h < h_i \qquad (1)$$

$$x = f(h-h_{ti}) \qquad (2)$$

where i, $h_i$, f(h), and $h_{ti}$ have meanings described below:

i: a suffix showing the ordinal number of the diffraction annular zones obtained by counting the diffraction annular zones in consecutive order from the diffraction annular zone of the diffraction relief including the optical axis, which is made the first annular zone, toward the circumference;

$h_i$: the distance of the border between the ith diffraction annular zone and the (i+1)th diffraction annular zone from the optical axis, where $h_0=0$;

f(h): a function of h; and $h_{ti}$: a constant with i made a suffix, where at least one of $h_{ti}$ is not zero.

DETAILED DESCRIPTION OF THE PREFERRED EMBODIMENT

Figure 1:
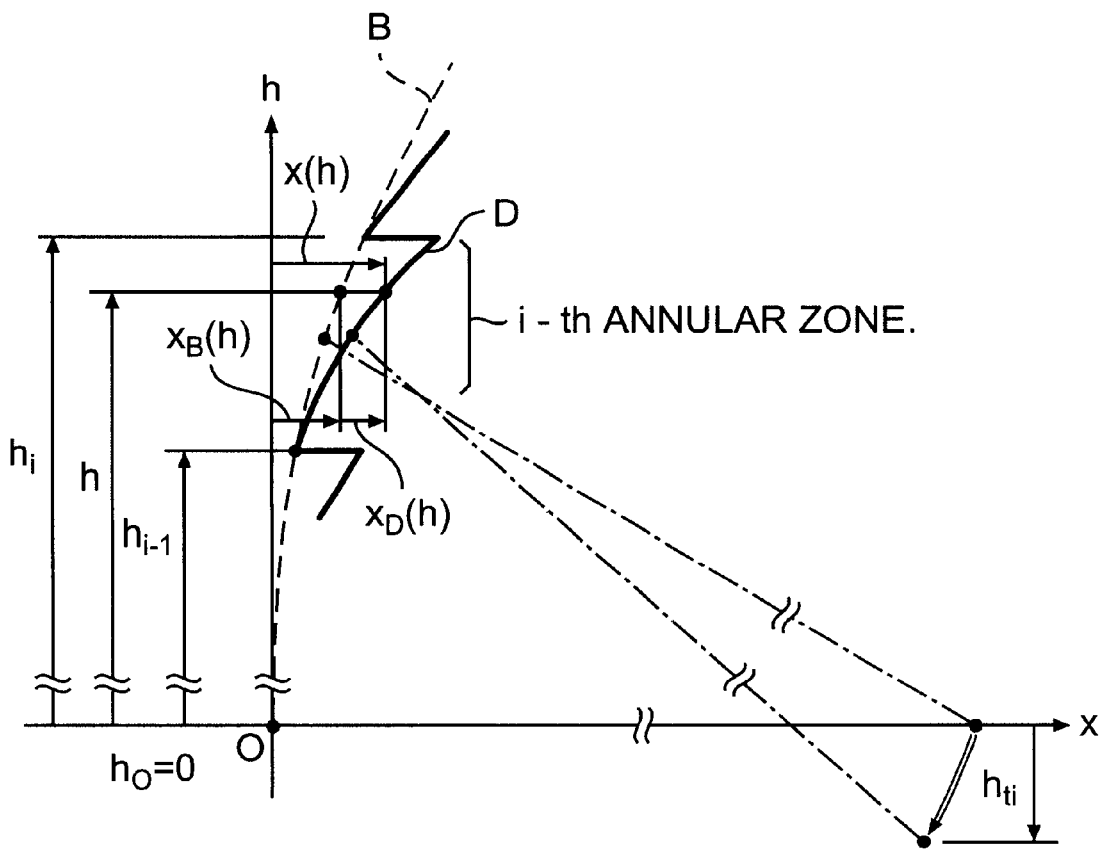
FIG. 1 is a drawing for illustrating the shape of the diffraction surface of a diffraction lens of this invention.
Figure 2:
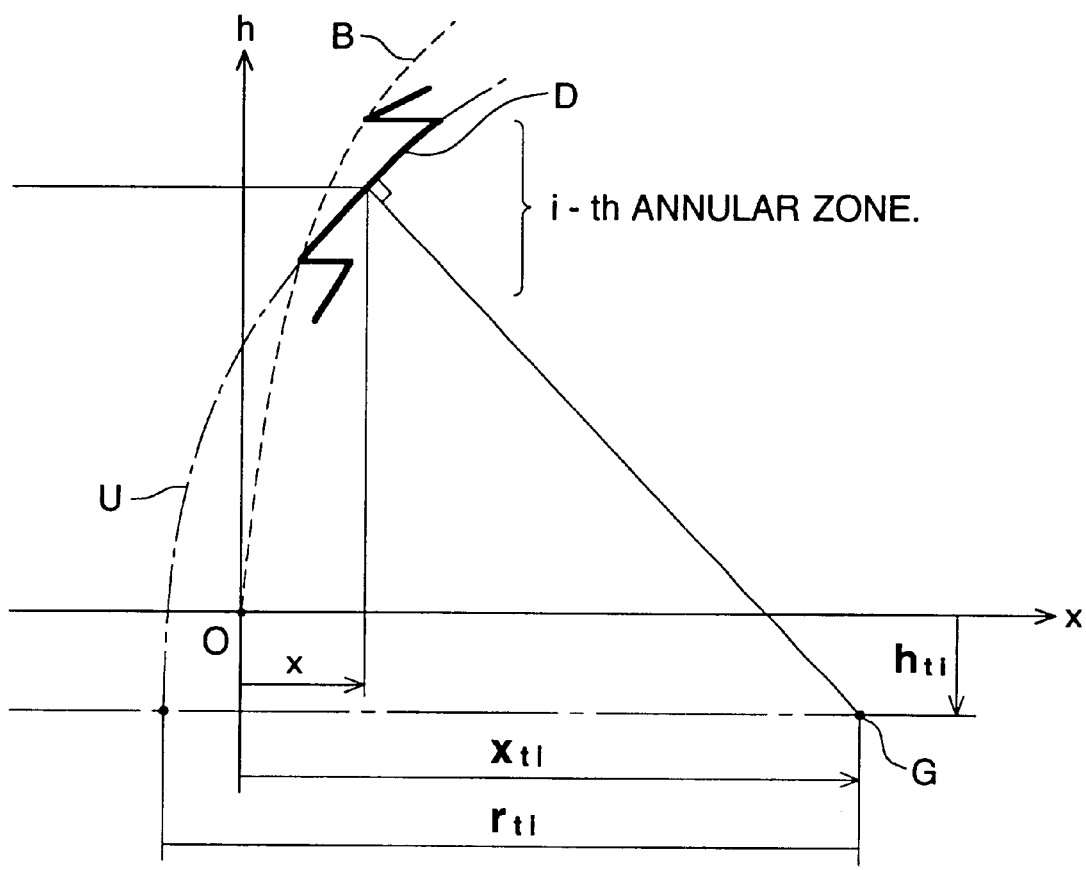
FIG. 2 is a drawing for illustrating the shape of the diffraction surface of an example of practice.
Figure 3:
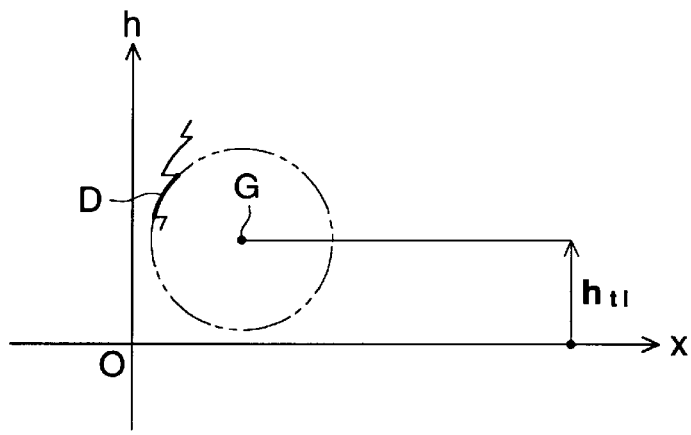
FIGS. 3(a) to 3(c) are drawings for illustrating the concept of the shape of the diffraction surface of a diffraction lens.
Figure 3:
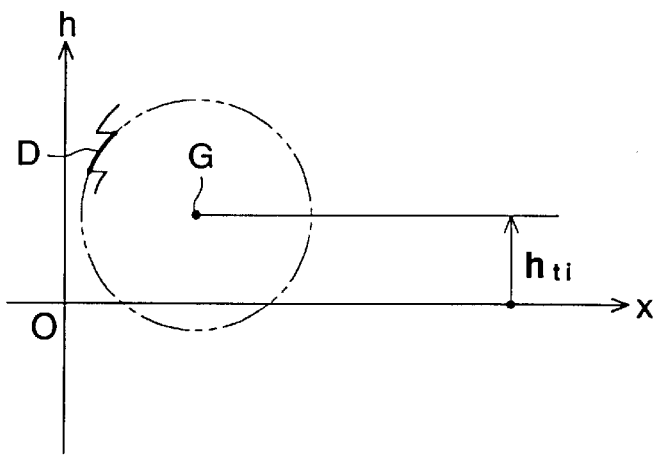
Figure 3:
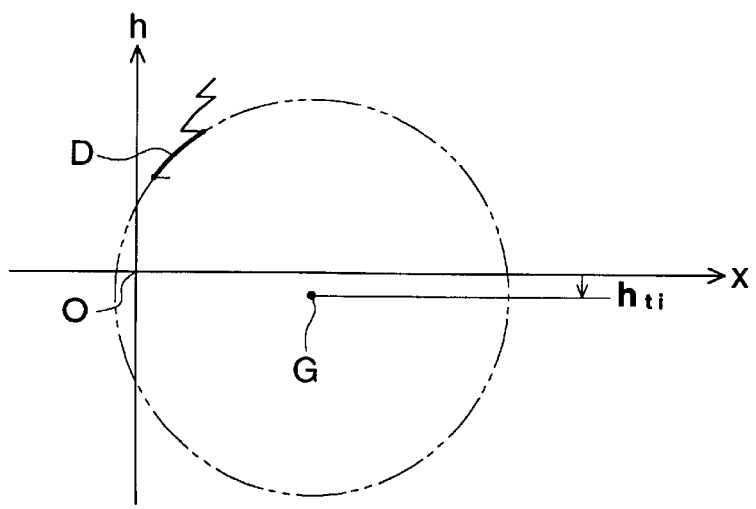
Figure 4:
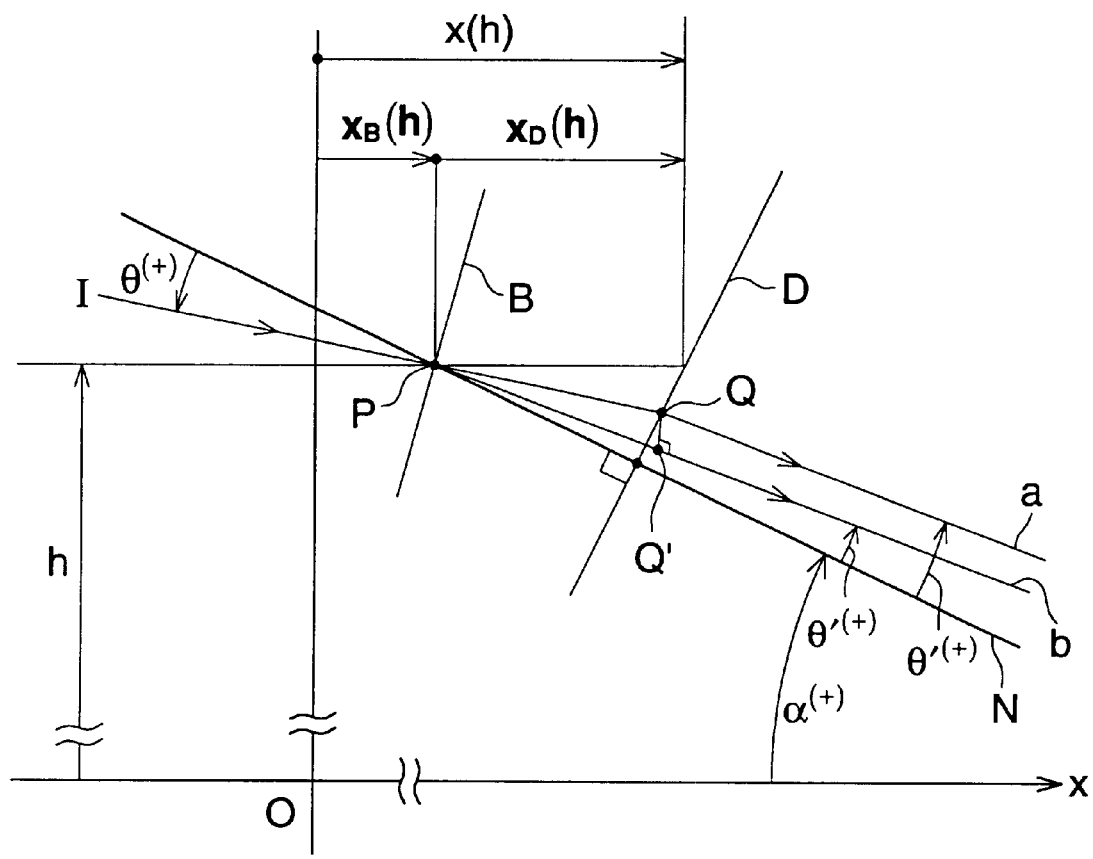
FIG. 4 is a drawing showing the relationship between the optical path difference of a diffraction lens and the amount of displacement of the diffraction surface.

The method of designing a lens of this invention and the diffraction lens will be explained with reference to the drawings. FIG. 1 is a drawing for illustrating the shape of the diffraction surface of a diffraction lens of this invention, FIG. 2 is a drawing for illustrating the shape of the diffraction surface of an example of practice, FIG. 3 is a drawing for illustrating the concept of the shape of the diffraction surface of a diffraction lens, and FIG. 4 is a drawing showing the relationship between the optical path difference of a diffraction lens and the amount of displacement of the diffraction surface.

First of all, the method of designing a diffraction lens of this invention will be explained. First, to explain the approximate shape of the diffraction surface of a diffraction lens of this invention, FIG. 1 shows schematically the cross-sectional shape of the portion of the ith annular zone in the diffraction surface. In addition, the number i of the annular zone is the one given by counting the annular zones in consecutive order from the central zone including the optical axis, which is made the first annular zone, toward the circumference. In FIG. 1, the dotted line B shows the basic aspherical surface or basic spherical surface showing the macroscopic shape (hereinafter referred to as the basic aspherical surface inclusively). Further, the solid line D shows the shape of the diffraction surface, and has a shape of displacement in order to give a predetermined optical path difference to the basic aspherical surface. In the case where it is intended to make high the diffraction efficiency of the predetermined number of order, with respect to each of the annular zones, the ith annular zone in FIG. 1, this amount of displacement $x_D(h)$ is generally a linear quantity against the height h from the optical axis x. Because the amount of displacement $x_D(h)$ is small in comparison with the width of the annular zones, the cross-sectional shape of the diffraction surface of the ith annular zone can be approximated by a shape formed by tilting the shape of the basic aspherical surface in the range of the height $h_{i-1}$ to $h_i$ by the predetermined angle. That is, to let $x_B(h)$ be the amount of displacement of the basic aspherical surface, the cross-sectional shape of the diffraction surface of the ith annular zone is expressed by the values obtained through the rotational transformation of $x_B(h)$ and h around a certain point. Because the amount of displacement $x_B(h)$ is generally expressed as a function of h, the cross-sectional shape of the diffraction surface D of the ith annular zone can be approximated by a function of $(h-h_{ti})$, $f(h-h_{ti})$ where $h_{ti}$ is a constant. In the above, the explanation has been done by using the cross-sectional shape of a diffraction lens, and a rotational solid obtained by rotating the cross-sectional shape around the optical axis can be also expressed by a function $g(h-h_{ti})$.

As described in the above, in this invention, a good approximate function for the cross-sectional shape of a diffraction surface can be obtained simply. Accordingly, in making a metallic mold for manufacturing this diffraction lens, the programming etc. for working the metallic mold is also easy.

Next, an example of the approximate function for a concrete shape of the diffraction surface of a diffraction lens will be explained with reference to FIG. 1, FIG. 2, and the above-described expression (3). The above-described expression (3) shows an example of a concrete approximate function. In FIG. 1, although the basic aspherical surface B is aspherical as a whole, in the cross-section of the basic aspherical surface B, the portion corresponding to the diffraction surface in each of the annular zones can be approximated by an arc. Accordingly, the cross-sectional shape of the diffraction surface in this annular zone formed by tilting this arc is also an arc. By rotating this arc around the optical axis, the solid shape of the diffraction surface of the annular zone can be obtained, and this is expressed by the above-described expression (3).

To explain the above-described expression (3) with reference to FIG. 2 in more detail, FIG. 2 is a drawing for illustrating the shape of the diffraction surface of an example of practice. In the drawing, the shape of the diffraction surface is a part of the shape formed by rotating the circle (approximation circle U) having the radius $r_{ti}$, where G is let to be the center of the circle which is apart from the optical axis by the predetermined amount $h_{ti}$. Besides, the distance $x_{ti}$ denotes the distance from the apex O of the basic aspherical surface B to the foot of the perpendicular from the center G to the x axis.

In the following, the positional relationship between the center of the circle G and the optical axis will be explained with reference to FIG. 3. FIG. 3(a) shows the case where the circumference of the circle shown by the double dot and a dash line does not meet the optical axis. The shape of the diffraction surface D of the annular zone in this case becomes a shape formed by the rotation of the arc around the x-axis. Further, FIG. 3(b) shows the case where the circumference of the circle shown by the double dot and a dash line intersects the optical axis and the constant $h_{ti}$ is positive. The shape of the diffraction surface D of the annular zone in this case also becomes a shape formed by the rotation of the arc around the x-axis. Further, FIG. 3(c) shows the case where the circumference of the circle shown by the double dot and a dash line intersects the optical axis and the constant $h_{ti}$ is negative. The shape of the diffraction surface D of the annular zone in this case also becomes a shape formed by the rotation of the arc around the x-axis. In addition, the diffraction surface of the annular zone of an example of practice to be described later is one of the type of FIG. 3(c).

Further, the approximate functions for the shape of other diffraction surfaces of this invention are shown in (M5) and (M6). These expressions have aspherical terms.

$$x = \frac{(h-h_{ti})^2/r_{ti}}{1+\sqrt{1-(1+k_i)(h-h_{ti})^2/r_{ti}^2}} + x_{ti} - r_{ti} + \sum_j A_{ij}h^j \quad (M5)$$

$$x = \frac{(h-h_{ti})^2/r_{ti}}{1+\sqrt{1-(1+k_i)(h-h_{ti})^2/r_{ti}^2}} + x_{ti} - r_{ti} + \sum_j A_{ij}(h-h_{ti})^j \quad (M6)$$

In the above-described expressions, $k_i$ and $A_{ij}$ denote aspherical coefficients respectively.

In the following, the method of obtaining the shape of the diffraction surface (diffraction relief) expressed by the above-described expression (2) or expression (3) from the optical path difference function $\Phi(h)$ will be explained.

First, the optical path difference $\Phi_D(h)$ produced by providing the shape of the diffraction relief should be obtained by (M7).

$$\Phi_D(h)=\Phi(h)+(i-1)\lambda. \quad (M7)$$

The optical path difference $\Phi_D(h)$ is the optical path difference produced by providing a shape of a diffraction relief for a ray which is incident to the basic aspherical surface at the position of height h from the optical axis, and in the above-described expression, it is assumed that $\Phi_D(h)=0$ at the vertex of the sawtooth shape of the diffraction surface in each of the annular zones. Further, λ in the expression denotes the standard wavelength.

In the following, the relationship between the optical path difference $\Phi_D(h)$ and the amount of displacement of the diffraction relief x(h) will be explained with reference to FIG. 4 and the expression (4). The expression (4) shows the relationship between the optical path difference $\Phi_D(h)$ and the amount of displacement of the diffraction relief x(h). FIG. 4 shows the relationship between the ray which is incident on the diffraction surface in one of the annular zones and the ray which is diffracted in the predetermined number of order. In FIG. 4, let the point P be the point of incidence to the basic aspherical surface B and the point Q be the point of incidence to the actual diffraction relief D. Further, let the angle α be the angle made by the normal N to the diffraction relief D and the optical axis x, the angle θ be the angle made by the incident ray I and the normal N to the diffraction relief D, and the angle θ' be the angle made by the ray diffracted in the predetermined number of order and the normal N to the diffraction relief D. Further, let the amount of displacement $x_D(h)$ be the amount of displacement of the diffraction relief D from the basic aspherical surface B, and the amount of displacement $x_B(h)$ be the distance from the perpendicular to the x-axis at the apex O to the point P, then the amount of displacement of the diffraction relief is expressed by $x(h)=x_D(h)+x_B(h)$.

Let the ray a in the drawing be the emerging ray diffracted at the point Q, the ray b be the diffracted ray at the point P in the same number of order in the case where the value of the optical path difference Φ(h) at the point P is assumed to be zero, further the point Q' be the foot of the perpendicular to the ray b from the point Q, and the optical path difference (PQ)–(PQ') produced by the amount of displacement of the diffraction relief $x_D(h)$, then by making $x_D(h)$ equal to the optical path difference $\Phi_D(h)$, the expression shown in (M8) is obtained from the relationship shown in FIG. 4.

$$x_D(h) = \frac{\Phi_D(h)\cos\theta}{\cos\alpha\{n - n'\cos(\theta - \theta')\}} \quad (M8)$$

Accordingly, the amount of displacement x(h) from the plane including the apex O of the basic aspherical surface and being perpendicular to the optical axis x becomes the expression shown in (M9).

$$x(h) = \frac{\Phi_D(h)\cos\theta}{\cos\alpha\{n - n'\cos(\theta - \theta')\}} + x_B(h) \quad (M9)$$

Further, the expression (M8) becomes the expression shown in (M10) by making the approximation that n'·sin θ'=n·sin θ.

$$x_D(h) = \frac{\Phi_D(h)}{\cos\alpha\{n\cos\theta - n'\cos\theta'\}} \quad (M10)$$

In addition, the diffraction lens of this invention may be a glass lens or a plastic lens, but a plastic lens is more desirable because it is easy to be manufactured by injection molding and gives a remarkable effect. Further, it is desirable that the diffraction relief to be provided on the diffraction lens is composed of concentric annular zones having the center at the optical axis; however, it may be composed of concentric annular zones having the center at a point deviated from the optical axis, or it may be composed of elliptical annular zones, or it may have a vortical shape. Further, it is desirable that the diffraction relief is of a blazed type (sawtooth).

Further, in the method of making a mold for manufacturing a diffraction lens having a diffraction relief on a lens surface, this invention has an effect such that the making the mold can be done easily, by which the manufacturing of diffraction lenses can be also carried out easily. In addition, the mold is made by a mold processing machine. A mold processing machine has a numerical control section and a processing machine main body.

Data to conduct a numerical control for the mold processing machine are produced based on the data regarding a shape by a computer which may be provided separately from the mold processing machine or built in the mold processing machine. Then, the mold processing machine produces a mold by cutting a mold frame material under the control by the numerical control section on the basis of the data regarding the shape. And then, using the mold, diffraction lenses are manufactured by the injection molding of the molten material for the diffraction lenses.

EXAMPLE OF PRACTICE

A diffraction lens of an example of practice of this invention will be explained with reference to the drawing. Further, the signs used are as follows:

f: the focal length;
d: the distance between the surfaces;
R: the curvature;
λ: the standard wavelength;
NA: the numerical aperture;
$n_d$: the refractive index for the d line; and
$v_d$: Abbe number.

The expression used in the example of practice is the below-described (M11).

$$x = \frac{h^2/R}{1 + \sqrt{1 - (1+k)h^2/R^2}} + \sum_{i=2}^{\infty} A_{2i}h^{2i} \quad (M11)$$

Further, the expression of the optical path difference function of the diffraction surface Φ(h) is the below-described (M12), where the unit is mm.

$$\Phi = \sum_{i=1}^{\infty} b_{2i} h^{2i} \quad (M12)$$

Figure 5:
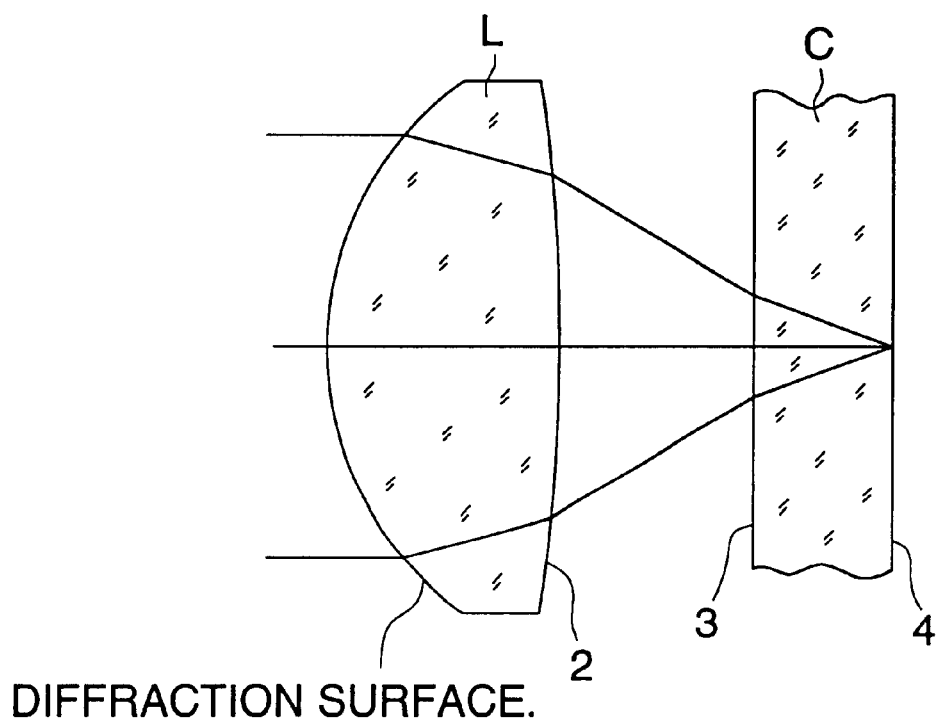
FIG. 5 is a cross-sectional view of an objective lens for use in an optical pick up device using the diffraction surface of the example of practice.

FIG. 5 is a cross-sectional view of an objective lens for use in an optical pick up device employing the diffraction surface of the example of practice, showing the diffraction lens L and the transparent substrate of a recording medium C.

The optical data of the diffraction lens L are shown in Table 1 and Table 2.

TABLE 1

| | f = 3.6 mm, NA = 0.5, λ = 650 nm | | | | | |
|---|---|---|---|---|---|---|
| SURFACE No | R | d | n (λ = 650 nm) | $v_d$ | $n_d$ | |
| 1* | 2.340 | 2.00 | 1.5411 | 56 | 1.5438 | DIFFRACTION SURFACE |
| 2* | −9.440 | 1.73 | | | | |
| 3 | ∞ | 1.20 | 1.5779 | 30 | 1.5830 | TRANSPARENT SUBSTRATE |
| 4 | ∞ | | | | | |

*INDICATE ASPHERICAL SURFACE.

TABLE 2

| SURFACE No | COEFFICIENT OF ASPHERICAL SURFACE |
|---|---|
| 1 | K = −0.42420 |
| | $A_4$ = −0.17083 × $10^{-2}$ |

TABLE 2-continued

|   | |
|---|---|
|   | $A_6 = -0.19457 \times 10^{-4}$ |
|   | $A_8 = -0.10581 \times 10^{-3}$ |
|   | $A_{10} = 0.64294 \times 10^{-5}$ |
| 2 | $K = 0.73342 \times 10$ |
|   | $A_4 = 0.66904 \times 10^{-2}$ |
|   | $A_6 = -0.11451 \times 10^{-2}$ |
|   | $A_8 = 0.24774 \times 10^{-3}$ |
|   | $A_{10} = -0.24302 \times 10^{-4}$ |

OPTICAL PATH DIFFERENCE FUNCTION OF
DIFFRACTION SURFACE $b_2 = -0.34780 \times 10^{-2}$
$b_4 = -0.22642 \times 10^{-3}$
$b_6 = 0.10528 \times 10^{-3}$
$b_8 = -0.39323 \times 10^{-4}$
$b_{10} = 0.45856 \times 10^{-5}$ Further, the data of the shape of the diffraction surface (diffraction relief) of the diffraction lens L are shown in Table 3.

TABLE 3

| i | $h_i$ | $x_D(h_i)$ ($\mu$m) | $r_{ti}$ | $h_{ti}$ | $x_{ti}$ |
|---|---|---|---|---|---|
| 1 | 0.429934 | 1.209 | 2.2979 | $-1.3429 \times 10^{-3}$ | 2.2979 |
| 2 | 0.605260 | 1.218 | 2.3768 | $-1.5663 \times 10^{-2}$ | 2.3743 |
| 3 | 0.738433 | 1.227 | 2.4494 | $-3.4402 \times 10^{-2}$ | 2.4432 |
| 4 | 0.849817 | 1.236 | 2.5225 | $-5.7299 \times 10^{-2}$ | 2.5114 |
| 5 | 0.947278 | 1.245 | 2.5970 | $-8.3872 \times 10^{-2}$ | 2.5797 |
| 6 | 1.034816 | 1.254 | 2.6730 | $-1.1383 \times 10^{-1}$ | 2.6483 |
| 7 | 1.114776 | 1.263 | 2.7505 | $-1.4693 \times 10^{-1}$ | 2.7172 |
| 8 | 1.188656 | 1.272 | 2.8297 | $-1.8303 \times 10^{-1}$ | 2.7864 |
| 9 | 1.257482 | 1.281 | 2.9106 | $-2.2199 \times 10^{-1}$ | 2.8560 |
| 10 | 1.321992 | 1.290 | 2.9931 | $-2.6367 \times 10^{-1}$ | 2.9259 |
| 11 | 1.382742 | 1.299 | 3.0772 | $-3.0796 \times 10^{-1}$ | 2.9962 |
| 12 | 1.440172 | 1.309 | 3.1627 | $-3.5468 \times 10^{-1}$ | 3.0665 |
| 13 | 1.494635 | 1.318 | 3.2501 | $-4.0397 \times 10^{-1}$ | 3.1373 |
| 14 | 1.546442 | 1.327 | 3.3381 | $-4.5514 \times 10^{-1}$ | 3.2077 |
| 15 | 1.595858 | 1.336 | 3.4278 | $-5.0862 \times 10^{-1}$ | 3.2783 |
| 16 | 1.643120 | 1.345 | 3.5191 | $-5.6439 \times 10^{-1}$ | 3.3493 |
| 17 | 1.688451 | 1.354 | 3.6107 | $-6.2154 \times 10^{-1}$ | 3.4195 |
| 18 | 1.732055 | 1.363 | 3.7045 | $-6.8124 \times 10^{-1}$ | 3.4904 |
| 19 | 1.774125 | 1.372 | 3.7993 | $-7.4275 \times 10^{-1}$ | 3.5613 |
| 20 | 1.814846 | 1.381 | 3.8959 | $-8.0641 \times 10^{-1}$ | 3.6325 |

In addition, the shape of the diffraction surface which is actually manufactured is a little different from the shape shown in Table 3 by the amount of rounding owing to the shape of the bite of the tool used.

This diffraction lens L is a lens which has a diffraction surface on the first surface of the lens and uses the first order diffraction rays.

Now, it will be explained below how the values of several quantities concerning the diffraction lens L of the example of practice were calculated. In order to obtain the constants $h_{ti}$, $r_{ti}$, and $x_{ti}$ shown in the above-described expression (3), the pursuit of rays was carried out for the three points, that is, the point at which the optical path difference $\Phi_D(h)$ is zero (the nearest point to the optical axis), the point at which it is equal to $-\lambda/2$, and the farthest point from the optical axis in each of the annular zones in the diffraction surface, and the amount of displacement $x(h)$ was obtained by using the above-described expression (4). From the expression of the circle which passes the three points determined by the above-mentioned amount of displacement, the respective values of the constants $h_{ti}$, $r_{ti}$, and $x_{ti}$ were obtained.

Besides, in the above-described process, by using the angle made by the normal to the basic aspherical surface and the optical axis x instead of the angle $\alpha$, the amount of displacement was first obtained, and by using this, the angle $\alpha$ made by the normal N to the diffraction surface and the optical axis x was obtained, to obtain the amount of displacement again.

As the result of obtaining the approximation error concerning the data for the shape of the diffraction surface which have been obtained in the above-described manner, it is 0.04 $\mu$m at the largest in the first annular zone of the diffraction surface, and it is not larger than 0.04 $\mu$m in other annular zones of the diffraction surface, to show satisfactory values.

Because of the above-described structure, the invention has the following effects:

According to the diffraction lens set forth in any one of the paragraphs (1) to (4), it can be obtained a diffraction lens which is manufactured on the basis of a simple high-precision approximate shape for transforming from the optical path difference function to the actual shape of the diffraction relief having steps. That is, a high-precision diffraction lens which can be manufactured simply can be obtained. Further, the manufacturing of a high-precision mold can be carried out easily.

According to the method of designing a diffraction lens of the invention set forth in the paragraph (5), the transformation to the actual shape of the diffraction relief having steps from the optical path difference function can be obtained as a simple high-precision approximate shape.

In addition, the disclosed embodiment can be varied by a skilled person without departing from the spirit and scope of the invention.

What is claimed is:

1. A diffractive lens having an optical axis, comprising:

a lens surface having a peripheral portion, and a diffractive relief provided on the lens surface, wherein the diffractive relief is shaped in annular zones, and wherein following conditional formulas (1) and (2) are satisfied:

$$h_{i-1} \leq h < h_i \quad (1)$$

$$x = f(h - h_{ti}) + S \quad (2)$$

where i is a suffix showing an ordinal number of each of the diffractive annular zones obtained by counting each diffractive annular zone in such a manner that a diffractive annular zone including the optical axis is counted as a first diffractive annular zone and other diffractive annular zone are counted respectively in consecutive order from the optical axis toward the peripheral portion;

h is a distance between a point on the diffractive relief and X axis in a direction perpendicular to X axis, wherein X axis locates on the optical axis;

x is a distance between the point and H axis in a direction parallel to X axis, wherein H axis is perpendicular to X axis at an original point predetermined on X axis;

$h_i$ is a distance from X axis to a border between i-th diffractive annular zone and (i+1)-th diffractive annular zone which are counted from the optical axis in the above manner, provided that $h_0=0$;

f(h) is a function of h to obtain a shape of the diffractive relief;

$h_{ti}$ is a constant in which at least one of $h_{ti}$ is not zero; and

S is a term characterizing an aspherical surface, and wherein f(h) is a following conditional formula (3):

$$f(h - h_{ti}) = \frac{(h - h_{ti})^2 / r_{ti}}{1 + \sqrt{1 - (h - h_{ti})^2 / r_{ti}^2}} + x_{ti} - r_{ti} \quad (3)$$

where $r_{ti}$ is a constant and $x_{ti}$ is a constant.

2. The diffractive lens of claim 1, wherein S is zero.

3. A diffractive lens having an optical axis, comprising:
a lens surface having a peripheral portion, and
a diffractive relief provided on the lens surface,
wherein the diffractive relief is shaped in annular zones, and
wherein following conditional formulas (1) and (2) are satisfied:

$$h_{i-1} \leq h < h_i \quad (1)$$
$$x = f(h - h_{ti}) + S \quad (2)$$

where
i is a suffix showing an ordinal number of each of the diffractive annular zones obtained by counting each diffractive annular zone in such a manner that a diffractive annular zone including the optical axis is counted as a first diffractive annular zone and other diffractive annular zone are counted respectively in consecutive order from the optical axis toward the peripheral portion;
h is a distance between a point on the diffractive relief and X axis in a direction perpendicular to X axis, wherein X axis locates on the optical axis;
x is a distance between the point and H axis in a direction parallel to X axis, wherein H axis is perpendicular to X axis at an original point predetermined on X axis;
$h_i$ is a distance from X axis to a border between i-th diffractive annular zone and (i+1)-th diffractive annular zone which are counted from the optical axis in the above manner, provided that $h_0 = 0$;
f(h) is a function of h to obtain a shape of the diffractive relief;
$h_{ti}$ is a constant in which at least one of $h_{ti}$ is not zero; and
S is a term characterizing an aspherical surface,
wherein the diffractive relief is shaped in a sawtooth on a cross sectional shape including the optical axis, and
wherein a difference in a direction parallel to the optical axis between a cross sectional shape of the diffractive relief and a cross sectional shape represented by a following general formula (4) is not larger than 0.2 of a basic wavelength:

$$x(h) = \frac{\Phi_D(h) \cos \theta}{\cos \alpha \{n - n' \cos(\theta - \theta')\}} + x_B(h) \quad (4)$$

where
$x_B(h)$ represents a shape of a basic aspherical surface or a basic spherical surface;
$\Phi_D(h)$ represents an optical path difference produced by providing the diffractive relief on the lens surface;
θ is an angle made between a ray, which comes from an object point on the optical axis and is incident on a diffractive surface, and a normal line on the diffractive surface;
θ' is an angle made between a ray, which comes from an object point on the optical axis and emerges from the diffractive surface, and a normal line on the diffractive surface;
α is an angle made between the optical axis and a normal line on the diffractive surface;
n is a refractive index of the incident side of the diffractive surface; and
n' is a refractive index of the emerging side of the diffractive surface.

4. The diffractive lens of claim 3, wherein S is zero.

* * * * *